Oct. 13, 1931.  E. A. KEELER  1,826,886
MEASURING ELECTRIC CONDUCTIVITY OF FLUID
Filed Oct. 22, 1923
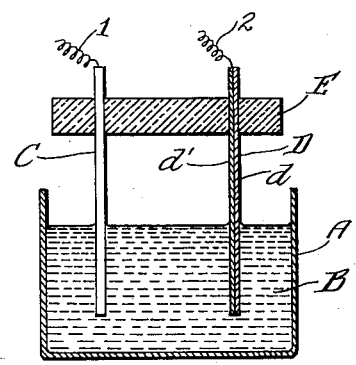
Fig.1,
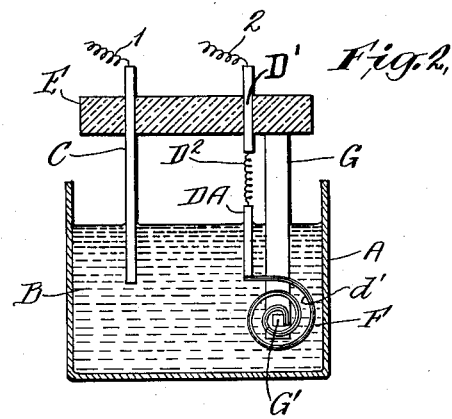
Fig.2,
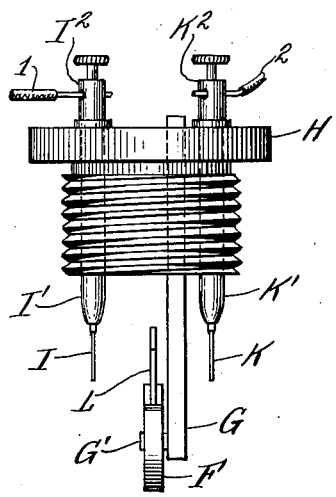
Fig.3,
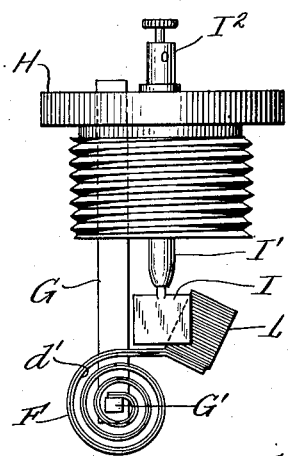
Fig.4,
INVENTOR
EARL A. KEELER
BY
John C. Hubbell
ATTORNEY Patented Oct. 13, 1931

1,826,886

UNITED STATES PATENT OFFICE

EARL A. KEELER, OF PHILADELPHIA, PENNSYLVANIA, ASSIGNOR TO BROWN INSTRUMENT COMPANY, OF PHILADELPHIA, PENNSYLVANIA, A CORPORATION OF PENNSYLVANIA

MEASURING ELECTRIC CONDUCTIVITY OF FLUID

Application filed October 22, 1923. Serial No. 670,143.

In measuring the electrical conductivity of some fluids and particularly electrolytes in solution, difficulty has heretofore been experienced because the conductivity of such a fluid varies with its temperature. In ordinary electrolytic solutions the variation in conductivity resulting from a change in temperature amounts to more than 1% per degree F. of temperature change, and is negative in character. Various arrangements have heretofore been devised for obtaining a compensation in the electrical measuring instrument, or in the circuit connecting it to the electrodes in contact with the electrolyte, for the effect of changes in the temperature of the electrolyte, but such arrangements have not been entirely satisfactory, and the general object of the present invention is to provide an improved method of, and means for automatically compensating for the effect of variations in the temperature of a fluid in measuring its electrical conductivity.

The invention is characterized by the provisions made for obtaining a mechanical adjustment of the electric path of flow between the electrodes connected to the measuring instrument, in automatic response to the temperature change in the fluid, and of such character as to maintain the resistance of said path of flow constant when the temperature of the electrolyte or other fluid forming the path changes. The mechanical adjustment of the flow path made in accordance with the present invention may consist in a change in the length, or the shape, or both the length and shape of the flow path between the electrodes by means of which the conductivity measurement is effected. In a preferred mode of effecting this adjustment I employ thermostatic means which are ordinarily immersed in the electrolyte so as to vary with the temperature of the latter, though in some cases they may be responsive in whole or in part to the temperature of the gas above the electrolytic solution, and which operate in response to a change in temperature to correspondingly vary the relative positions of the electrodes, or to adjust a barrier interposed between the electrodes or to otherwise vary the length or shape of the path of electric flow between the electrodes.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described preferred embodiments of my invention.

Of the drawings:

Fig. 1 is a diagrammatic elevation of one form of my invention.

Fig. 2 is a diagrammatic elevation of a second form of the invention.

Fig. 3 is an elevation of a third form of the invention; and

Fig. 4 is a view taken at right angles to Fig. 3.

In Fig. 1, A represents a vessel open at its upper end and containing an electrolytic solution B, the conductivity of which is measured by means comprising two electrodes C and D. As shown, the electrodes C and D are secured to a support E of insulating material. The electrode C may be of any usual or suitable form but the electrode D is in effect a bi-metallic thermostat composed of strips $d$ and $d'$ with a coefficient of thermal expansion of the strip $d'$ greater than that of the strip $d$, so that the electrode D bends toward and away from the electrode C as the temperature of the solution B decreases and increases, respectively. With the parts shown in Fig. 1 suitably proportioned and arranged, it is thus possible to cause the electrodes C and D to approach and separate as required to maintain an electric flow path of constant resistance between the electrodes C and D regardless of the temperature changes in the electrolyte. 1 and 2 represents conductors by means of which the electrodes C and D may be connected in circuit with a source of current and an electrical measuring instrument which may be of any suitable type and hence is not illustrated herein.

The form of my invention illustrated in

Fig. 2 differs from that shown in Fig. 1, in that the electrode D of Fig. 1 is replaced in Fig. 2 by an electrode DA which is carried at the free outer end of a bi-metallic thermostat in the form of a Briguet spiral, the inner end of which is secured to a stud G' carried at the lower end of a post G, the latter being attached at its upper end to the insulation support E. The electrode DA is electrically connected to a post member D' mounted in the support E by a flexible conductor D². In the Briguet spiral arranged as shown in Fig. 2, the strip d' having the greatest coefficient of thermal expansion is the inner strip so that the electrode DA will be moved toward and away from the electrode C as the temperature of the electrolytic solution B falls and rises. With the comparatively small range of movement thus imparted to the electrode DA, the movement of the latter is substantially wholly in the horizontal direction.

In the form of my invention illustrated in Figs. 3 and 4, H represents a metal plug adapted to be screwed into an aperture in the wall of a conduit or receptacle containing an electrolyte or other fluid, the conductivity of which is to be measured. Mounted in passages extending through the plug H are insulating sleeves I' and K' which surround the terminal portions of electrodes I and K, located at the inner end of the plug. At the outer end of the plug, the electrode terminal portions are connected to suitable binding posts I² and K². As shown, the electrodes I and K are in the form of parallel plate-like bodies, and the shape and effective length of the flow path between them is varied by means of a barrier L of insulating material which is movable in a plane between and parallel to the electrodes, by means of a thermostat shown as a Briquet spiral F supported from the plug H by means of a post G, as the spiral F is supported from the insulation body E in Fig. 2. With the arrangement shown in Figs. 3 and 4 when the temperature of the fluid with which the electrodes I and K are in contact increases, the barrier L is moved toward a position in which it extends directly between the electrodes I and K and correspondingly elongates and changes the shape of the path of electric flow between them, and as the temperature of the fluids decreases it is moved away from this position so that the conductivity of the flow path between the electrodes I and K is maintained constant notwithstanding variations in the temperature of the fluid material forming the path.

It will be apparent to those skilled in the art that the provisions illustrated and described form simple and effective means for accomplishing their intended purpose of maintaining a resistance of the electric flow path between the electrodes, which does not vary with the temperature of the fluid forming the path. By proceeding in accordance with the present invention it is possible to make each of a group of conductivity measuring electrode arrangements, self compensating so that they may all be used in conjunction with an ordinary measuring instrument without other compensating provisions to give conductivity measurements which are unaffected by the temperature of the fluids in contact with the electrodes. While in accordance with the provisions of the statutes I have illustrated and described the best forms of my invention now known to me it will be apparent to those skilled in the art that other forms of construction and arrangement may be employed without departing from the spirit of my invention as set forth in the appended claims.

Having now described my invention, what I claim as new and desire to obtain by Letters Patent, is:

1. A device for measuring the electric conductivity of a fluid having electrodes immersed in said fluid, an obstruction movable to vary the path of electrical flow between said electrodes, and thermally responsive means in the fluid for operating the obstruction in accordance with temperature changes of the fluid.

2. A device for measuring the electrical conductivity of a fluid having electrodes immersed in the fluid, a baffle arranged for movement across the path of electrical flow between the electrodes, a thermostat in the fluid for operating said baffle to compensate for the change in fluid conductivity with temperature changes.

Signed at New York in the county of New York and State of New York this 20 day of Oct., A. D. 1923.

EARL A. KEELER.